Figure 1:
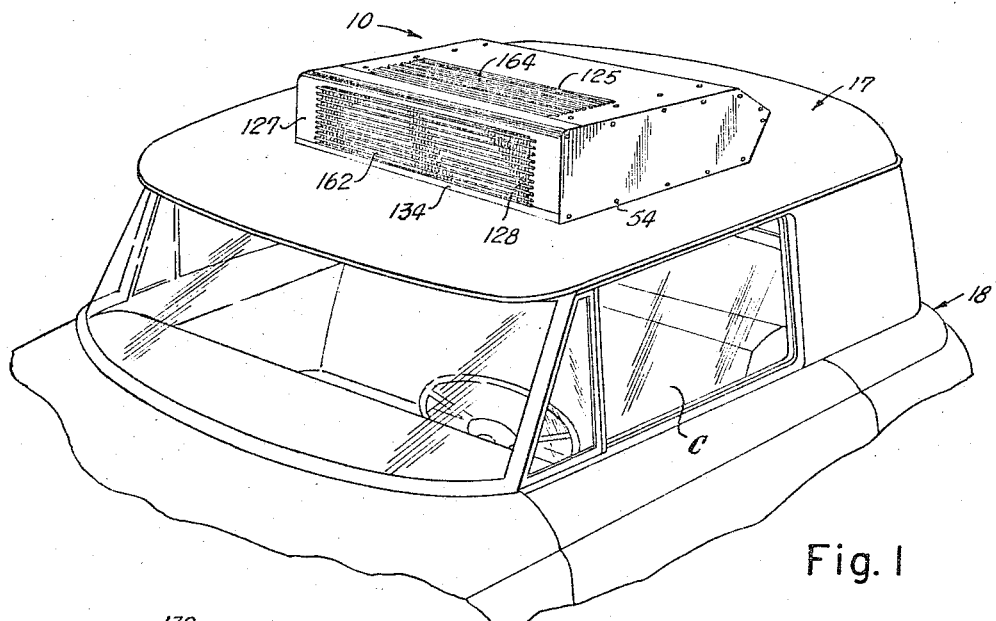

April 25, 1967  W. E. LIND  3,315,488
REFRIGERATION APPARATUS

Filed April 5, 1966

2 Sheets-Sheet 1

INVENTOR
William E. Lind

BY Hastings Ackley
and
Walter J. Jaynes
ATTORNEYS

April 25, 1967 W. E. LIND 3,315,488
REFRIGERATION APPARATUS
Filed April 5, 1966 2 Sheets-Sheet 2
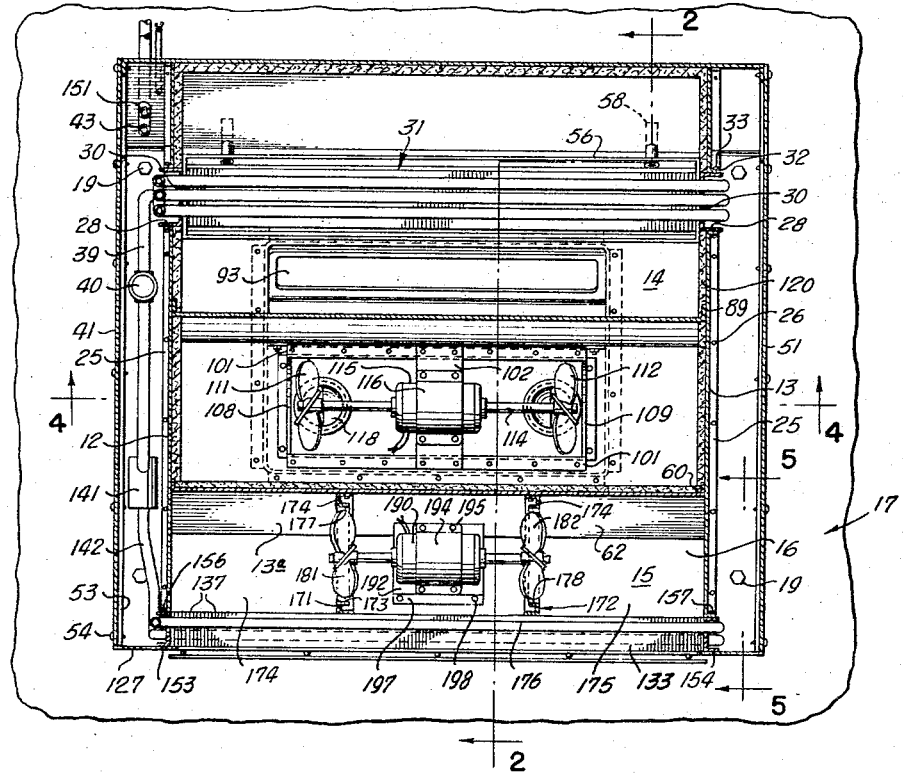
Fig. 3
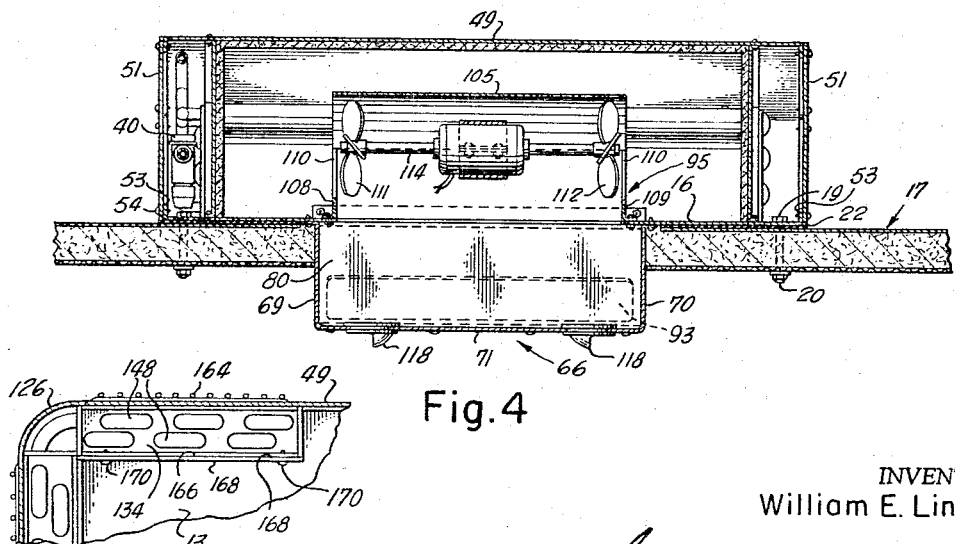
Fig. 4
Fig. 5
INVENTOR
William E. Lind
BY
ATTORNEYS United States Patent Office 3,315,488
Patented Apr. 25, 1967

3,315,488
REFRIGERATION APPARATUS
William E. Lind, Dallas, Tex., assignor to Cummins Engine Company, Inc., Columbus, Ind., a corporation of Indiana
Filed Apr. 5, 1966, Ser. No. 540,275
18 Claims. (Cl. 62—241)

This invention relates to refrigeration apparatus and more particularly to a condenser and to a condenser and evaporator assembly.

An object of the invention is providing a new and improved condenser and evaporator assembly for a refrigeration apparatus which is mountable on a roof of a vehicle, the condenser being positioned at the front of the assembly to cause the air to flow through the condenser during the movement of the vehicle and having air moving means for increasing air flow through the condenser during low speed movement or non-movement of the vehicle.

Another object is to provide a condenser and evaporator assembly wherein the evaporator is mounted rearwardly of the condenser and the assembly includes means for circulating air from a compartment of the vehicle through the evaporator and back into the compartment.

Still another object is to provide a new and improved condenser and evaporator assembly which has a housing providing a front condenser compartment and a rear evaporator compartment, the housing having a front aperture in its front wall opening to the front compartment and a top aperture in its top wall, the condenser having a front vertical section positioned immediately rearwardly of the front aperture and a top horizontal section positioned above the top aperture whereby air during the movement of the vehicle flows inwardly into the condenser compartment through the front conductor section and then upwardly and out of the condenser through the top horizontal condenser section.

A further object is to provide a condenser evaporator assembly wherein an evaporator and an air moving means are mounted in the rear compartment, the air moving means circulating air from a vehicle compartment through the evaporator and back into the vehicle compartment.

Another object is to provide a condenser and evaporator assembly wherein the condenser compartment is divided into a plurality of passages and air moving means are positioned in the condenser chamber to cause movement of the air inwardly into some of the passages through certain portions of the condenser sections and then outwardly through other portions of the condenser sections when the vehicle is stationary.

Still another object is to provide a condenser and evaporator assembly of relatively small dimensions.

A further object is to provide a condenser assembly having a housing having a compartment to which a front aperture and a top housing aperture open, and a condenser having a front vertical section disposed rearwardly of the front aperture and a top horizontal section disposed below the top aperture whereby when the condenser assembly is mounted on the roof of a vehicle and the vehicle is in forward motion, air flows into the compartment through the front aperture and the front condenser section and out of the compartment through the top condenser section and the top aperture.

A still further object is to provide a condenser assembly wherein an air moving means is positioned in the compartment for circulating air in opposite directions through different portions of each of the condenser sections when the vehicle is stationary or moving very slowly.

A still further object is to provide a condenser assembly wherein the rear end of the compartment is defined by a surface which slopes upward and rearwardly to facilitate flow of air through the compartment and the condenser sections during forward movement of the vehicle.

Figure 2:
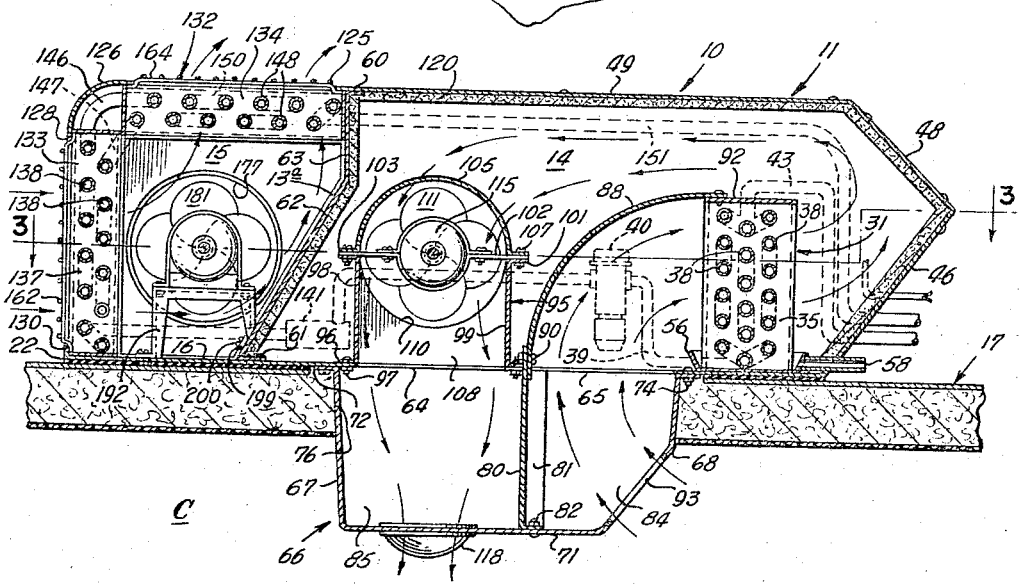

Additional objects and advantages of the invention will be readily apparent from the reading of the following description of a device constructed in accordance with the invention, and reference to the accompanying drawings thereof, wherein:

FIGURE 1 is a perspective view of the condenser and evaporator assembly mounted on the roof of a vehicle;
FIGURE 2 is a vertical sectional view of the condenser and evaporator assembly taken on line 2—2 of FIGURE 3;
FIGURE 3 is a sectional view taken on line 3—3 of FIGURE 2;
FIGURE 4 is a sectional view taken on line 4—4 of FIGURE 3; and,
FIGURE 5 is a fragmentary vertical sectional view taken on line 5—5 of FIGURE 4.

Referring now to the drawings, the heat exchanger assembly 10 embodying the invention includes a housing 11 which with its internal parallel side partitions 12 and 13 and transverse partition 13a forms a rear evaporator compartment 14 and a front condenser compartment 15. The housing includes a flat base plate 16 securable to the roof 17 of a vehicle 18 by means of a plurality of dependent studs 19 rigid with the base which extend downwardly through suitable apertures provided in the roof and have cap nuts 20 on their threaded lower end portions. Suitable resilient gaskets or seals 22 are interposed between the base plate and the roof to seal therebetween. The thickness of such gaskets will of course vary with the curvature or contour of the roof of the vehicle on which the assembly is mounted. The side partitions have outwardly extending bottom flanges 25 resting on the base plate and secured to the base plate by screws 26. The side partitions have downwardly opening aligned slots 28 adjacent their rear ends in which are received the channel shaped end plates 30 of an evaporator 31. The side partitions have flanges 32 which abut the flanges of the evaporator end plates and are secured thereto in any suitable manner, as by screws 33.

The evaporator may be of any usual type having a plurality of vertical spaced cooling fins 35 provided with aligned apertures through which extend refrigerant flow tubes which form three parallel serpentine coils 38 whose lower inlet ends are connected through a conduit 39 to the outlet of an expansion valve 40 mounted between the side wall 41 of the housing and the side partition 12. The upper outlet or exhaust ends of the evaporator coils are connected to an outlet conduit 43 which extends rearwardly of the housing through a suitable aperture in the lower upwardly and rearwardly inclined housing rear wall section 46 to the suction inlet of the compressor of a refrigeration system. The upper housing rear wall section 48 extends forwardly and upwardly to the top horizontal housing section 49.

The housing side walls 41 and 51 which extend forwardly from the rear wall sections and downwardly of the top housing section telescope over the upwardly extending side flanges 53 of the base plate and may be secured thereto by screws 54. The lower portion of the evaporator is disposed in a drain pan 56 the end portions of whose side walls may be bent toward and secured to the flanges of the end plates as by soldering. Drain tubes 58 extend from the bottom of the trough rearwardly through apertures in the rear housing wall to carry condensate from the trough to the exterior of the housing.

The transverse partition 13a which defines the rear end of the condenser compartment has rearwardly extending edge flanges 60 which abut the base plate, the side partitions, and the top housing section and are secured thereto in any suitable manner as by screws. The lower section 62 of the transverse partition slopes upwardly and rearwardly to its top vertical sections 63.

The base plate has a pair of rectangular apertures 64 and 65 which open upwardly to the evaporator compartment and downwardly to a substantially rectangular duct 66 which extends downwardly from the base plate. The duct has front and rear walls 67 and 68, end walls 69 and 70 and a bottom wall 71. The top outwardly extending flange 72 of the duct abuts the bottom surface of the base plate and is rigidly secured thereto by screws 74. Suitable sealing means (not shown) may be interposed between the top flange of the duct and the base plate. The duct extends through an aperture 76 of the roof 17 into the chamber C of the vehicle.

A vertical transverse partition 80 of the duct extends upwardly from its bottom wall 71 and between its end walls 69 and 70 and is secured to the bottom wall and the end walls by means of its flanges 81 and screws 82. The duct partition divides the duct into an inlet passage 84 and an outlet passage 85. A rearwardly and upwardly curving wall 88 extends between the side partitions 12 and 13 and has end flanges 89 which are secured to the side partitions by screws. The curved wall also has a central dependent portion which extends into the duct 66, abuts the top portion of the duct partition 80 and is secured thereto by screws 90. The wall 88 extends over and is connected to the top plate 92 of the evaporator 31 as by screws so that air which flows upwardly and inwardly into the inlet passage from the compartment C through the aperture 93 of the upwardly sloping portion of the bottom duct wall 71 must pass through the evaporator.

A rectangular duct 95 extends about the aperture 64 of the base plate and is rigidly secured thereto by means of its bottom external flange 96 and screws 97. The side walls 98 and 99 of the duct 95 have outwardly extending top flanges 101 over which extend the opposite end portions of the motor mount plate 102 and the side flanges 103 of an arcuate hood 105. The hood flanges at the location of the ends of the motor mount plate are bent upwardly to receive the motor mount plate ends. The mount plate and the flanges of the hood are rigidly secured to the top flanges of the duct 95 by bolts 107.

The end walls 108 and 109 of the duct 95 have upwardly opening arcuate recesses 110 therein of substantially the same radius and center of curvature as the hood and thus define with the hood circular openings through which air is drawn into the duct by the fans 111 and 112 mounted on the opposite ends of the shaft 114 of the electric motor 115 supported on the mount plate. The motor is rigidly secured to the mount plate by a clamp 116 whose end flanges are secured to the mount plate by bolts 117.

The bottom wall 71 of the duct 66 has openings in which are rotatably mounted air deflectors 118 by means of which the direction of flow of air from the outlet passage into the compartment C of the vehicle may be adjusted. The pitch of the two fans are such that both draw air inwardly from the evaporator compartment and move it downwardly through the outlet passage 85 of the duct 67 and into the vehicle compartment through the deflectors 118.

The internal surfaces of the rear wall between the side partitions, the rear surface of the transverse partition 13 and the internal surfaces of the side partitions between the transverse partition and the rear wall are lined with a layer 120 of a heat insulating material such as asbestos, rock wool or the like.

The top housing section has an aperture or opening 125 whose forward end is defined by the rearwardly extending top flange 126 of the front housing wall 127. The front housing wall similarly has a front aperture or opening 128 whose lower end is defined by the front upwardly extending flange 130 of the base plate.

The condenser 132 of the heat exchanger assembly 10 has a front vertical section 133 positioned rearwardly of the front housing aperture and a horizontal top section 134 positioned rearwardly of the vertical cooling section and below the top housing aperture 125. The condenser sections may be of any usual type. For example, the front condenser section may comprise a plurality of vertical spaced cooling fins 137 provided with aligned apertures through which extend refrigerant flow tubes which form two serpentine coils 138 whose bottom or outlet ends are connected to the inlet 140 of a receiver 141 by a conduit 142. The upper or inlet ends of the coils are connected by the conduits 146 and 147 to the outlet ends of the similar coils 148 of the top condenser section which extend through aligned apertures of spaced cooling fins 150. The rear or outlet ends of the coils 148 are connected by a conduit 151 which extends rearwardly through a suitable aperture in the housing rear wall, to the high pressure discharge outlet of a compressor of a refrigeration system. The end plates 153 and 154 of the front vertical flanges 156 and 157 of the side partitions 12 and 13, respectively, and are secured thereto by screws. The front flange 130 of the base plate extends forwardly of the lower portion of the front condenser section and the lower end portions of the vertical wires of a protective wire grill 162 extend downwardly between the front flange and the front cooling section. Similarly, the upper end portions of the vertical wires extend inwardly of the portion of the front housing wall defining the top end of the front aperture 128. The protective wire grill is thus held against displacement from the housing. A similar protective wire grill 164 covers the top housing aperture, the front end portions of its longitudinally extending wires extending below the rear edge portion of the flange 126 of the front housing wall and their rear end portions extending below the forward edge portions of the top housing section defining the rear end of the aperture 125.

The channel shape end plates 166 of the top condenser section are received in the forward top recesses 168 of the side partitions and are rigidly secured to the horizontal flanges 169 of the side partitions by screws 170.

A pair of divider or orifice plates 171 and 172 extend between the base plate and the top condenser section and between the front condenser section and the partition 13a and are rigidly secured by means of their flanges 173 and screws 174 to the base plate and the partition. The orifice plates divide the compartment into end passages 174 and 175 and a middle passage 176. The passages are preferably equal in length for reasons to be described below.

The divider or orifice plates 171 and 172 have orifices 177 and 178, respectively, which provide communication between the end passages 174 and 175 and opposite ends of the middle passage. Fans 181 and 182 located in the orifices 177 and 178, respectively, are rigidly secured to opposite ends of the drive shaft 184 of an electric motor 190. The motor is secured to a motor mount 192 by means of a clamp band 194 secured to the motor mount by bolts 195. The front lower flange 197 of the motor mount rests upon and is secured to the base plate by bolts 198 while its rear inclined flange 199 rests on the partition and is secured thereto by bolts 200. The pitch and direction of rotation of the fans is such that when the motor is in operation, air is moved by the fans from the end passages 174 and 175 through the orifices 177 and 178 into opposite ends of the middle passage.

Electric current to the motors 115 and 190 is supplied by suitable cables which extend thereto through suitable apertures in the rear housing wall and the housing partitions.

In use, when the condenser and evaporator assembly 10 is mounted on a vehicle and the vehicle is moving forwardly, the motor 190 is not energized and the hot compressed refrigerant fluid from the compressor, which flows first through the coils of the top condenser section and then through the coils of the front condenser section, is cooled and liquified by the absorption of heat therefrom by air which flows through the front aperture 128 of the housing and the front condenser section and then upwardly through the top condenser section and the top aperture 125 due to the movement of the vehicle. The air flowing by ram action into the condenser compartment through the front condenser section is deflected or directed upwardly to flow through the top condenser section by the rearwardly and upwardly sloping partition which defines the rear end of the condenser compartment.

At this time, the motor 115 which drives the fans 111 and 112 is in operation and draws air from the rear of the vehicle compartment or chamber C, through the inlet passage 84 of the duct 67, the evaporator 31 and then into the duct 95 and downwardly through the passage 85 and the deflectors 118 back into the vehicle compartment. It will be apparent heat is absorbed from the air being moved by the fans 111 and 112 by the refrigerant fluid as it flows through the coils of the evaporator and evaporates and expands therein.

If the vehicle is stationary or moving very slowly, in order to cause proper operation of the condenser, the motor 190 is energized and the fans 181 and 182 cause air to be drawn into the end passages 174 and 175 through opposite end portions of the front top condenser sections which extend outwardly of the two orifice plates. The air thus moved by the fans into the end passages is moved in opposite directions through the orifices of the two orifice plates into the middle section and then horizontally forwardly through the middle portion of the front vertical condenser section between the two orifice plates and also vertically upwardly through the middle section of the top horizontal condenser section between the two orifice plates. The fans 181 and 182 thus increase the circulation of the air through the condenser when proper or sufficient circulation of air due to ram flow through the condenser cannot be obtained because the vehicle is stationary or is moving very slowly.

Since the passages 174, 175 and 176 are of the same length, the air moves outwardly from the middle passage 176 through the middle portions of the front and top condenser sections at twice the rate of movement of the air through the outer end portions thereof into the end passages 174 and 176 since the air moved by both fans must flow outwardly through the middle portions of the condenser sections. This difference of the rate or volume per unit of time of flow of air through the outer end portions and the middle portions of the heat exchanger of the condenser sections increases the efficiency of the condenser since the temperature of the air flowing through the outer end portions of the coil assembly into the end passages 174 and 175 increases as it absorbs heat from the hot refrigerant gas in the coils and the air flowing outwardly from the middle passage through the middle portions of the condenser sections is therefore of a higher temperature. The increased rate of flow of air through the middle portions of the condenser sections thus compensates for its higher temperature relative to that of the refrigerant gas and insures proper transfer of heat from the refrigerant gas to the air, it being apparent that the rate of transfer of heat varies not only with the difference in the temperature of the air and the refrigerant gas but also with the volume of air per unit of time moving through the middle and end portions of the heat of the condenser sections.

It will also be apparent that the blades of the fans 181 and 182 are of opposite pitch, even in number, for example 4, and rotatable about an axis which is perpendicular to the direction of ram flow of air through the passages during the normal movement of the vehicle, such ram flow of air thereby does not cause the fans to rotate thus minimizing wear of the bearings which support the drive shaft.

It will be apparent that since the vehicle may be driven at very high speeds, for example over 60 miles an hour, if the fans were rotatable about an axis parallel to the direction of flow of air through the passages, the fans would be rotated at a very high speed, much higher than their speed of rotation when driven by the motor, resulting in excessive wear of the bearings supporting the drive shaft.

It will now be apparent the positioning of the two condenser sections in the manner illustrated and described permits the condenser and evaporator assembly to have a relatively small height and still provide for proper cooling and condensation of the hot compressed refrigerant fluid flowing through the condenser whether the flow of air therethrough takes place due to ram effect when the vehicle is moving forwardly or due to the operation of the fans 181 and 182.

It will further be seen that even if the fans 111 and 112 are not being rotated and the vehicle is stationary, convective circulation of air will be established due to the location of the top horizontal condenser section above the front vertical section and the circulation of the refrigerant fluid first through the top condenser section and then through the front condenser section so that the temperature of the refrigerant fluid flowing through the top condenser will be higher than the temperature of the refrigerant fluid flowing through the front condenser section.

It will further be seen that the rotation of the motor 190 may be reversed to cause the air to flow inwardly into the middle passage through the middle portions of the two condenser sections and then outwardly from the end passages through the opposite end portions of the two condenser sections.

It will further be seen that if it is desired to mount the evaporator at a location other than on the roof of a vehicle the condenser alone may be mounted on the roof and functioned in the manner described. In this case, the housing would, of course, provide only the front condenser compartment.

It will also be seen that while a condenser assembly has been described and illustrated which has two divider plates dividing the condenser compartment into three passages and two fans for moving air through the orifices of the divider plates, the condenser compartment could be divided into only two passages by a single divider plate in which case only one fan would be employed to move air from one passage to the other through the orifice of such single divider plate.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A condenser and evaporator assembly mountable on a vehicle, said assembly including: a housing mountable on the roof of a vehicle and having a front condenser compartment and rear evaporator compartment, said housing having a front aperture opening into said condenser compartment at its front end and a top aperture opening to said condenser compartment at its top; a condenser in said condenser compartment and having a front section positioned rearwardly of said front aperture and a top section mounted below said top aperture and rearwardly of said front section, whereby when said vehicle is in forward movement air flows into said condenser compartment through said front aperture and said front condenser section and then out of said condenser compartment through said top condenser section and said top aperture; an evaporator mounted in said evaporator compartment; means providing an inlet passage and an outlet passage opening to said evaporator compartment and also opening to a compartment of a vehicle when said assembly is mounted on the roof of the vehicle; and means for circulating air from said inlet passage through said evaporator to said outlet passage.

2. The assembly of claim 1 and means in said condenser compartment for increasing flow of air through said condenser sections.

3. The assembly of claim 2, wherein said means for increasing flow of air includes divider means dividing said condenser compartment between said condenser sections into a plurality of passages, and air moving means operatively associated with said divider means for moving air from one of said passages into another of said passages whereby when said air moving means is in operation, air is drawn into one of said passages through one portion of each of said condenser sections and expelled outwardly from another of said passages through another portion of each of said condenser sections.

4. The assembly of claim 3, wherein said divider means includes a vertical divider plate having an orifice, said air moving means being operatively associated with said divider plate for moving air through said orifice from one of said passages to another of said passages.

5. The assembly of claim 4 wherein said means providing said inlet passage and said outlet passage comprises a duct extending downwardly from said housing.

6. The assembly of claim 5 wherein said housing includes a rearwardly and upwardly sloping partition which facilitates flow of air through said condenser sections during the forward movement of the vehicle.

7. The assembly of claim 1 wherein said housing includes a rearwardly and upwardly sloping partition which facilitates flow of air through said condenser sections during the forward movement of the vehicle.

8. The assembly of claim 4 wherein said housing includes a rearwardly and upwardly sloping partition which facilitates flow of air through said condenser sections during the forward movement of the vehicle.

9. The assembly of claim 1, a pair of vertical spaced divider plates in said condenser compartment between said condenser sections dividing said compartment into a pair of end passages and a middle passage between said end passages, said divider plates having orifices; a motor mounted in said middle passage; and fans in said orifices driven by said motor for causing flow of air through said orifices between said end passages and said middle passage.

10. A condenser assembly for use on a vehicle, said condenser including: a housing mountable on the roof of the vehicle and having a compartment, said housing having a front aperture opening into said compartment from its front end and a top aperture opening to said compartment at its top; a condenser mounted in said condenser compartment and having a front section positioned rearwardly of said front aperture and a top section mounted below said top aperture whereby when said vehicle is in forward movement air flows into said compartment through said front aperture and said front condenser section and out of said compartment through said top condenser section and said top aperture.

11. The condenser assembly of claim 10, and means in said compartment for increasing flow of air through said condenser sections.

12. The condenser assembly of claim 11 wherein said means for increasing flow of air includes divider means dividing said compartment between said condenser sections into a plurality of passages, and air moving means operatively associated with said divider means for moving air from one of said passages into another of said passages whereby when said air moving means is in operation air is drawn into one of said passages through one portion of each of said condenser sections and expelled outwardly from another of said passages through another portion of each of said condenser sections.

13. The condenser assembly of claim 12 wherein said housing has an upwardly and rearwardly sloping surface defining the rear end of said compartment for facilitating rearward and upward movement of air through said front condenser section to said top condenser section.

14. The condenser assembly of claim 10 wherein said housing has an upwardly and rearwardly sloping surface defining the rear end of said compartment for facilitating upward movement of air in said compartment to said top condenser section during forward movement of a vehicle on which the condenser assembly is mounted.

15. The condenser assembly of claim 10, and a pair of spaced divider plates in said compartment dividing said compartment into end passages and a middle passage between said end passages, said divider plates having orifices communicating the middle passage with said end passages, and air moving means operatively associated with said divider plates for moving air between said end passages and said middle passage.

16. The condenser assembly of claim 15 wherein said air moving means including a motor and fans driven by said motor for moving air in opposite directions through said orifices of said divider plates.

17. The condenser assembly of claim 16, wherein said condenser sections have tubular coils, the coils of the two sections being connected to permit hot refrigerant fluid to flow first through the coils of said top horizontal condenser section and then through the coils of said front vertical condenser section.

18. The condenser assembly of claim 10, wherein said condenser sections have tubular coils, the coils of the two sections being connected to permit hot refrigerant fluid to flow first through the coils of said top horizontal condenser section and then through the coils of said front vertical condenser section.

References Cited by the Examiner

UNITED STATES PATENTS

| | | | |
|---|---|---|---|
| 2,115,785 | 5/1938 | Peo | 62—97 |
| 2,182,569 | 12/1939 | Peo | 62—241 |
| 2,799,143 | 7/1957 | Weigel | 62—196 |
| 2,977,774 | 4/1961 | Ferris | 62—212 |
| 3,163,995 | 1/1965 | Maier | 62—241 |

WILLIAM J. WYE, *Primary Examiner.*